No. 855,630. PATENTED JUNE 4, 1907.
F. G. GREEN.
SEED PLANTER.
APPLICATION FILED MAY 3, 1906.

2 SHEETS—SHEET 1.

Inventor
F. G. Green

Witnesses

By W. J. Fitzgerald
Attorneys

No. 855,630.  
PATENTED JUNE 4, 1907.  
F. G. GREEN.  
SEED PLANTER.  
APPLICATION FILED MAY 3, 1906.

2 SHEETS—SHEET 2.

Witnesses  
Inventor  
F. G. Green  
By W. J. FitzGerald & Co.  
Attorneys

UNITED STATES PATENT OFFICE.

FELIX G. GREEN, OF SEDALIA, MISSOURI.

SEED-PLANTER.

No. 855,630.

Specification of Letters Patent.

Patented June 4, 1907.

Application filed May 3, 1906. Serial No. 315,052.

*To all whom it may concern:*

Be it known that I, FELIX G. GREEN, a citizen of the United States, residing at Sedalia, in the county of Pettis and State of Missouri, have invented certain new and useful Improvements in Seed-Planters; and I do hereby declare the following to be a full, clear and exact description of the invention, such as will enable others skilled in the art to which it appertains to make and use the same.

My invention relates to planting machines and is an improvement upon my former application, Patent Number 786284, patented April 4, 1905.

My object is to provide means for setting the dropping mechanism whereby the grain will be dropped so as to register with the preceding rows.
A still further object is to provide means for discharging the grain from the hopper to the row.

Other objects and advantages will be hereinafter more clearly set forth in the specification and pointed out in the claims.

In the accompanying drawings I have shown the preferred form of my invention.

Figure 1:
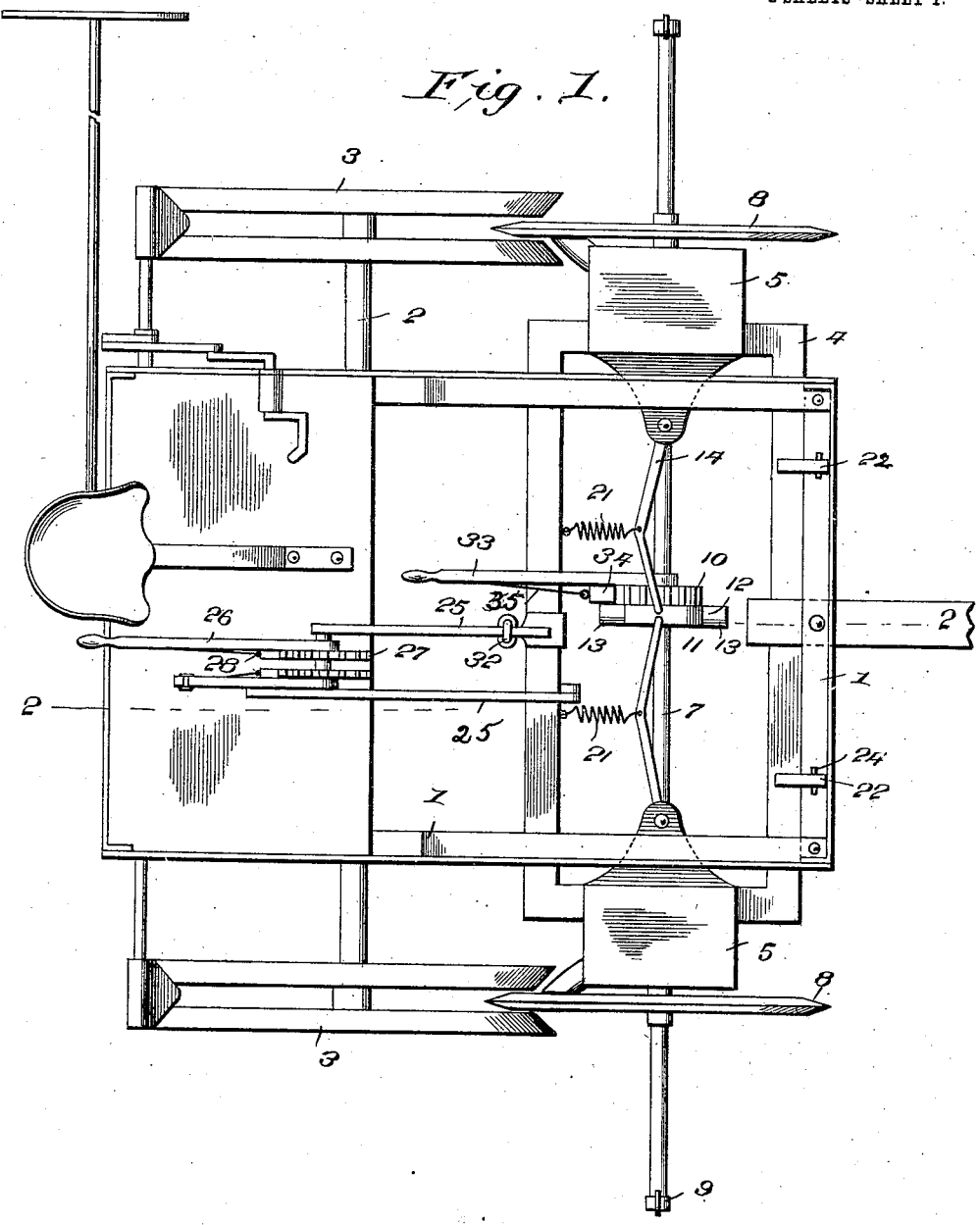
Figure 2:
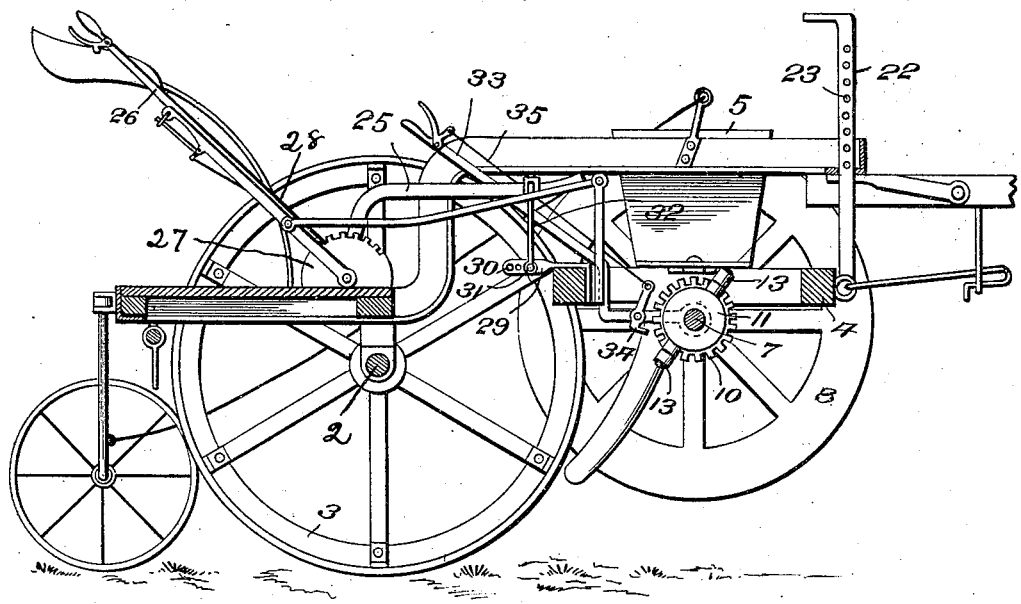
Figure 3:
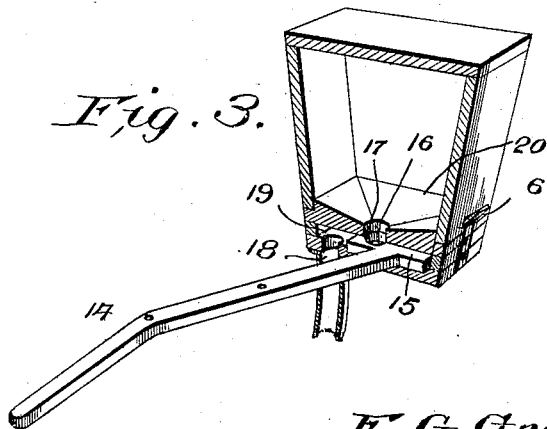

In said drawings—Figure 1 is a top plan view of my improved seed planter; Fig. 2 is a sectional view thereof as seen from the line 2—2 Fig. 1; and Fig. 3 is a detail perspective view of one of the grain boxes and parts adjacent thereto.

Referring to the figures by numerals of reference 1 indicates the frame of my improved invention which is preferably constructed of angle irons, said frame being mounted upon an axle 2 to the opposite ends of which are secured supporting wheels 3. The frame 1 is directed upwardly and forwardly of the axle 2 and has mounted there-below an auxiliary frame 4, said frame extending beyond each side of the main frame and has mounted thereon grain receiving boxes 5, said boxes being removably secured to the auxiliary frame 4 by means of spring catches 6. Longitudinally mounted below the auxiliary frame 4 is a shaft 7, said shaft having mounted thereon furrow making disks 8 while at the extreme outer ends of said shaft are secured marking arms 9. Disposed upon the shaft 7 midway between the grain receiving boxes is a pinion 10, which is secured to an actuating wheel 11, said wheel and pinion being rigidly secured to the shaft and caused to turn therewith. The actuating wheel 11 is provided with pins or lugs 12 upon which are mounted anti-friction rollers 13, said rollers being designed to engage the inner ends of the dropping arms 14, said arms being pivotally secured to a projection upon the auxiliary frame and extending into coöperation with the grain receiving boxes, said arms having at their inner ends feed plates 15, each of said plates having an opening 16 therein which is adapted to alternately register with an opening 17 in the bottom of the grain receiving boxes and with the feeding chutes or tubes 18 respectively. The feed plates 15 are disposed in a chamber 19 formed between the bottom 20 of the grain receiving boxes and the auxiliary frame 4, said plates being so constructed that when the grain is being deposited in the feeding tubes 18, the opening 17 in the bottom 20 will be closed. After the dropping arms 14 have been moved forwardly by the actuating wheel 11, they will be returned to their normal position by means of springs 21, said springs being secured at one end to their respective dropping arms and at their opposite ends to the auxiliary frame 4 so that as soon as the rollers 13 have passed beyond the ends of the dropping arms, they will be immediately returned by said springs and disposed in position to receive a new supply of grain.

One side of the auxiliary frame 4 is adjustably secured to the front end of the main frame 1 by means of bars 22, said bars being pivotally secured at their lower ends to the auxiliary frame and extending through slots in the main frame, each of said bars being provided with a plurality of openings 23 through which take locking pins 24, and by disposing said pins in different openings, the height of said auxiliary frame may be varied. The opposite edge of the auxiliary frame 4 is supported upon an arm 25, said arm being secured to a controlling lever 26, said lever being pivotally secured to a rack-bar 27 with which is adapted to engage a spring controlled locking latch 28 carried by the lever 26. To the inner edge of the auxiliary frame 4 is secured a plate 29, said plate having a plurality of openings 30 therein through which is adapted to alternately take a bolt 31, said bolt serving to secure to said plate a clevis 32, said clevis extending upwardly and engaging the arm 25. By this construction it will be seen that the auxiliary frame and the parts carried thereby may be readily raised or lowered and it will further be seen that when the furrow making disks encounter an obstruction that the auxiliary frame may be elevated without operating the controlling lever 26 from the fact that the clevis 32 will freely move over the arm 25.

Heretofore it has generally been customary when the end of the row was reached to dismount from the planter and manually turn the marking arms to such a position that when the planter is moved forward, the grain will be dropped so as to register with the preceding row and to obviate dismounting from the planter and to save the time lost in this operation, I have pivotally mounted upon the shaft 7 in juxtaposition to the pinion 10 a lever 33, said lever extending rearwardly in reach of the operator upon the planter. To the lower end of the lever 33 is pivotally secured a locking dog 34 which is designed to be moved into engagement with the pinion 10 by means of the controlling wire 35 extending from said locking dog to the upper end of the lever 33. By this construction it will be seen that when it is desired to rotate the shaft 7 so as to start the dropping of the grain on a line with the grain dropped in the preceding rows, the locking dog 34 may be brought into engagement with the pinion 10 and the lever 33 moved forwardly the desired distance and it will also be seen that by this construction the shaft 7 may be rotated in either direction as desired.

For the purpose of lightness, I have provided the furrow making disks 8 with spokes, a flange being secured at the outer ends of said spokes and said flange being provided around its periphery with a wedge-shaped cutting edge so that the same will readily take into the ground.

What I claim is:—

1. A planter of the class described comprising the combination with a main frame, a shaft carrying said frame, and supporting wheels therefor; of an auxiliary frame, means to adjustably secure said auxiliary frame to the main frame, a shaft rotatably secured to said auxiliary frame, furrow making disks secured to said shaft, grain receptacles carried by said frame, feed plates in coöperation with said grain receptacles, arms integral with said plates and extending laterally therefrom, and means carried upon said shaft adapted to simultaneously engage and passed between the free ends of said arms and operate said feed plates.

2. A planter of the class described comprising the combination with a main frame and supporting wheels therefor; of an auxiliary frame, a shaft rotatably carried by said auxiliary frame, furrow making disks carried by said shaft, grain receptacles on said frame, feed plates in said receptacles, arms integral with said plates and pivoted to said frame, an actuating wheel on said shaft, means carried by said actuating wheel to simultaneously engage and passed between the free ends of said arms to drop the grain, a pinion on said shaft, and means to engage said pinion whereby said shaft may be rotated in either direction.

3. In a planter of the class described, the combination with a main frame, the axle and supporting wheels, of an auxiliary frame adjustably supported from and beneath the forward end of the main frame, a shaft rotatably mounted in the auxiliary frame, grain receptacles on the auxiliary frame beyond the sides of the main frame, an actuating wheel on said shafts, lugs extending therefrom, feed plates guided in said receptacles, arms extending toward each other from said plates, and springs connecting said arms between their ends with the auxiliary frame, the free ends of said arms being disposed vertically over said lugs to be engaged simultaneously thereby.

4. In a planter of the class described, the combination with a main frame, the axle and supporting wheels, of an auxiliary frame adjustably supported from and beneath the forward end of the main frame, a shaft rotatably mounted in the auxiliary frame, grain receptacles on the auxiliary frame beyond the sides of the main frame, an actuating wheel on said shafts, lugs extending therefrom, feed plates guided in said receptacles, arms extending toward each other from said plates, springs connecting said arms between their ends with the auxiliary frame, the free ends of said arms being disposed vertically over said lugs to be engaged simultaneously thereby, and rollers on the ends of said lugs adapted to pass between the free ends of said arms.

In testimony whereof I have signed my name to this specification in the presence of two subscribing witnesses.

FELIX G. GREEN.

Witnesses:
EDWARD M. SHIELDS,
JOHN CLINGENFREEL.